Patented Aug. 15, 1939

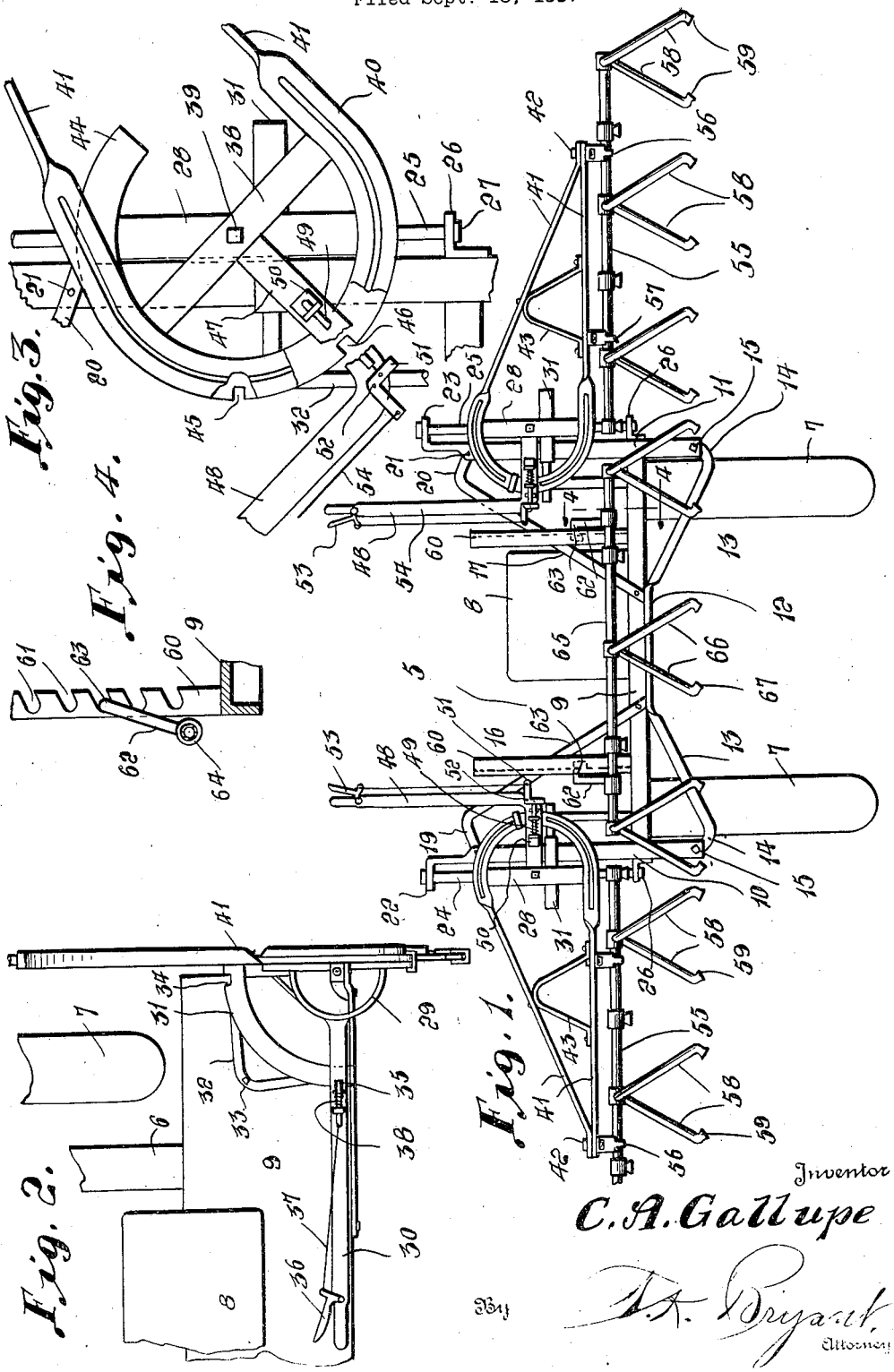

2,169,948

UNITED STATES PATENT OFFICE 2,169,948

AMBULANT SPRAYING MACHINE

Charles A. Gallupe, Mars Hill, Maine

Application September 18, 1937, Serial No. 164,586

2 Claims. (Cl. 299—29)

This invention relates to certain new and useful improvements in ambulant spraying machines.

The primary object of this invention is to provide a spraying machine having laterally extending spray pipes capable of being swung on a vertical axis along side the vehicle for the purpose of easy transportation when moving the machine from one location to another whereby the spray pipes will be out of the way of obstructions such as trees, rocks, and the like.

A further object of this invention is to provide a device of the above mentioned character in which the laterally extending spray pipes may be adjusted vertically to space the spray nozzles the proper distance from the surface upon which the machine is travelling.

A further object of this invention is to provide a system of levers for effecting the vertical adjustment of the laterally extending spray pipes as well as means for swinging the spray booms from the lateral position to a position parallel with the side of the vehicle.

A further object of this invention is to provide a central spray pipe which is suspended from a pair of brackets arranged on the rear portion of the vehicle and said brackets are provided with adjustable means for accommodating the raising and lowering of the spray pipe when desired.

Other objects and advantages of the invention will become apparent during the course of the following description, taken with the drawing, wherein, Figure 1 is a rear plan view of the device embodying this invention illustrating the vehicle or tractor and showing the laterally extending spray pipes or booms carried thereby;

Figure 2 is an enlarged top plan view of a portion of the tractor illustrating one of the operating levers for swinging the spray pipe or boom from the lateral to the parallel position;

Figure 3 is an enlarged side elevational view partly broken away, showing the vertical pivot member for the spray pipe or boom and the manner in which the same may be locked either vertically or horizontally; and Figure 4 is a vertical cross-sectional view through one of the central spray pipe supporting brackets, illustrating the same in detail.

In the drawing, wherein for the purpose of illustrating the invention and wherein like reference characters will be employed to designate like parts throughout the same, the reference character 5 will generally be employed to designate a tractor including a wheeled frame 6 supported by wheels 7. The operator's seat 8 is mounted on the rear portion of the wheeled frame 6 and extending across the rearmost portion of the wheel frame 6 is a platform 9 which may be held in place by any suitable means.

Secured to opposite ends of the platform 9 are vertical brackets 10 and 11. A strap iron 12 is fastened to the underside of the platform 9 and has its opposite free end as at 13 extending downwardly and slightly curved as at 14 for connection with the vertical brackets 10 and 11 by suitable bolts 15. Also secured to the platform 9 are brace bars 16 and 17 which are identical and have the upper ends as at 19 and 20 angularly bent for connection with the top portions of the vertical brackets 1 and 11 respectively. Bolts 21 or other fastening means may be provided for anchoring the free ends 19 and 20 of the brace bars 16 and 17 respectively in place.

The uppermost ends of the brackets 10 and 11 are angularly bent as at 22 and 23 for pivotally supporting the upper ends of stub axles 24 and 25. The lower ends of the stub axles 24 and 25 are held in place by means of angle brackets 26 as at 27.

Pivotally mounted upon the vertical stub-axles 24 and 25 are bearing blocks 28 and secured to each bearing block 28 is a yoke 29 from which extends a lever 30. The bearing block 28 may be rotated about a 90° arc and a sector plate 31 is supported from the platform 9 by means of a bracket 32 anchored as at 33 over which the lever 30 is adapted to travel. Notches 34 are formed in each end of the sector shaped plate 31 for receiving a locking pin 35 carried by the lever 30 and operated by a hand piece 36 through the medium of a flexible connection 37. A coil spring 38 is provided for normally urging the locking pin 35 into engagement with the slots or notches 34.

Pivotally carried by each of the pivot blocks 28 is an arm 38 pivoted as at 39 and having its free end connected to a semi-circular bar 40. The semi-circular bar 40 is provided with extensions 41, the free ends of which are connected as at 42 by means of a bolt or other locking device. A brace member 43 is provided for bracing the extension 41 and preventing bending thereof.

Also carried by the pivot block 28 is a sector-shaped plate 44 having notches 45 and 46 and said sector-shaped plate 44 may be secured to the pivot block 28 in any suitable fashion.

Extending laterally from the pivot arm 38 is a bar 47 having its outermost end bent and extending at right angles thereto to form a lever 48 carrying a locking pin 49 slidably mounted in a guide 50. The locking pin 49 is connected to a bell crank 51 pivoted to the lever 48 as at 52 and a handle operating device 53 may be provided for operating the detent or locking pin 49 through the medium of a connecting bar 54.

It will be understood that the semi-circular plate 40 carried by the pivot block 28 on the vertical shafts 24 and 25 are identical and that the arms 41 forming continuations of the semi-circular plate 40 extend from opposite sides of the tractor 5.

Supported from the lowermost extension 41 of the semi-circular plate 40 is a spray pipe 55 suitably supported by depending hangers 56 and 57 carried by the outermost portion of the arm 41 and the innermost portion respectively. The spray pipes 55 are also duplicate and extend from the opposite sides of the tractor 5 and are provided with spray tubes 58 having the nozzle 59 converging in a direction to give the best possible results.

When the spray pipe supports or booms 41 are swung to a position parallel with the side of the vehicle, the free ends of the spray pipes 55 may be supported by means of a hook carried by the vehicle adjacent the forward end thereof. In order to move the spray pipes 55 to the longitudinal or parallel position from that shown in Fig. 1 the levers 30 are operated and the hand piece 36 is simultaneously compressed to release the locking pin 35. After the spray pipe support 41 has been swung into the desired position, the handle piece 36 is released, allowing the locking pin 35 to drop to one of the notches 34, thereby locking the lever 30 and the spray pipe supports 41 against displacement.

Extending upwardly from the platform 9 along the rear edge thereof are vertical angle bars 60 having a series of notches 61 for receiving downwardly depending hooks 62. The upper ends of the hooks 62 are bent inwardly as at 63 to be received in the notches 61. The lower end of the downwardly depending hook 62 is provided with a circular boss 64 for receiving a spray pipe 65 having downwardly and outwardly extending spray tubes 66 similar to the spray tubes 58. The nozzles 67 of the spray tubes 66 also converge inwardly. In order to adjust the central spray pipe 65 with respect to the surface upon which the tractor is travelling, the hooks 62 are removed from their notches and moved to the desired notches above or below as at 61 to effect the desired adjustment.

Suitable tubes or flexible piping may connect the spray pipes 55 and 65 to a source of fluid supply such as a disinfectant carried by the tractor and also, suitable valves may be provided for controlling the flow of fluid through the spray pipes 55 and 65. As these elements are structural details, they have not been shown in the drawing or described minutely.

It is to be understood that the form of the invention herewith shown and described is to be taken as the preferred embodiment of the same and that various changes in the shape, size and arrangement of parts may be resorted to without departing from the spirit and scope of the invention as claimed.

I claim:

1. An ambulant discharge device including a wheeled frame having a platform, each side of the platform carrying a vertical spindle, a block rotatably mounted on the spindle, a spray pipe support pivoted at one end on a horizontal axis on said block whereby the outer end thereof may swing vertically and independent manually operable means respectively engaged with said support and block for selectively vertically swinging said support and moving said support in a horizontal plane towards and away from the wheeled frame.

2. An ambulant discharge device, as set forth in claim 1, characterized by the mounting for the spray arm support including an arcuate head at the pivoted end of said support, a cross arm extending between the sides of the arcuate head with the horizontal axis pivot extending through the cross arm, an arcuate plate fixed to said block beneath said arcuate head and having spaced notches therein and one of said operating means for said arm having an element fixed to said cross arm and a latch selectively positioned in the notches of said arcuate plate.

CHARLES A. GALLUPE.